United States Patent
Cronin et al.

(10) Patent No.: US 10,304,249 B2
(45) Date of Patent: May 28, 2019

(54) VIRTUAL HOTEL ROOM ENTERTAINMENT WHERE ROOMS CAN BE CHOSEN BASED UPON VR ENTERTAINMENT

(71) Applicant: PANASONIC INTELLECTUAL PROPERTY MANAGEMENT CO., LTD., Osaka (JP)

(72) Inventors: John Cronin, Bonita Springs, FL (US); Michael Glynn D'Andrea, Burlington, VT (US); Justin Kunz, Williston, VT (US); Kota Morisaki, Arlington, VA (US)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 223 days.

(21) Appl. No.: 15/438,050

(22) Filed: Feb. 21, 2017

(65) Prior Publication Data
US 2018/0240274 A1    Aug. 23, 2018

(51) Int. Cl.
| | |
|---|---|
| G06T 19/00 | (2011.01) |
| H04N 9/31 | (2006.01) |
| G06F 3/01 | (2006.01) |
| G06Q 10/02 | (2012.01) |
| G06Q 50/12 | (2012.01) |
| G06K 9/00 | (2006.01) |

(52) U.S. Cl.
CPC ............ G06T 19/006 (2013.01); G06F 3/011 (2013.01); G06Q 10/02 (2013.01); G06Q 50/12 (2013.01); H04N 9/3179 (2013.01); H04N 9/3194 (2013.01); *G06K 9/00671* (2013.01)

(58) Field of Classification Search
CPC ....... G06T 19/006; G06F 3/011; G06Q 10/02; G06Q 50/12
USPC ......................................................... 345/419
See application file for complete search history.

(56) References Cited

U.S. PATENT DOCUMENTS

| | | | |
|---|---|---|---|
| 8,128,500 B1 | 3/2012 | Borst et al. | |
| 9,038,112 B2 * | 5/2015 | Warrick ................. | H04N 7/106 725/78 |
| 9,195,677 B2 * | 11/2015 | Ball ................... | H04N 21/4122 |
| 2002/0001472 A1 | 1/2002 | Ohmura et al. | |
| 2003/0149576 A1 * | 8/2003 | Sunyich ................. | G06Q 10/02 705/5 |
| 2005/0081161 A1 * | 4/2005 | MacInnes ........... | G06F 17/5004 715/765 |

(Continued)

*Primary Examiner* — King Y Poon
*Assistant Examiner* — Vincent Peren
(74) *Attorney, Agent, or Firm* — Greenblum & Bernstein, P.L.C.

(57) ABSTRACT

Various methods, systems and media for enhancing a resort hotel service using virtual reality are provided. A reservation for a hotel room with a designated room theme is acquired, and the hotel room reservation with the designated room theme is stored in a first database. Data relating to objects in the reserved hotel room and dimensions of the objects are extracted from a second database. Theme projection information corresponding to the designated room theme is extracted from a third database. A projection is displayed in the reserved hotel room using a projector and a three-dimensional modeling tool, based on the extracted data relating to the objects in the reserved hotel room, the dimensions of the objects, and the extracted theme projection information.

12 Claims, 8 Drawing Sheets

(56) References Cited

U.S. PATENT DOCUMENTS

| | | |
|---|---|---|
| 2007/0174467 A1 | 7/2007 | Ballou, Jr. et al. |
| 2007/0219832 A1 | 9/2007 | Willacy |
| 2009/0119013 A1 | 5/2009 | O'Malley |
| 2016/0026253 A1 | 1/2016 | Bradski et al. |
| 2018/0173404 A1* | 6/2018 | Smith ................. G06F 3/04842 |
| 2018/0240274 A1* | 8/2018 | Cronin ................. G06T 19/006 |
| 2018/0260988 A1* | 9/2018 | Huang ..................... G06F 3/14 |

* cited by examiner

VIRTUAL HOTEL ROOM ENTERTAINMENT WHERE ROOMS CAN BE CHOSEN BASED UPON VR ENTERTAINMENT

BACKGROUND

1. Field of the Disclosure

The present disclosure relates to the field of resorts, theme parks, amusement facilities, and other venues having defined physical spaces. More particularly, the present disclosure relates to the projection of virtual reality entertainment into the defined physical spaces.

2. Background Information

Resorts, theme parks, and amusement facilities provide visitors with enjoyment as the visitors navigate about the venues. The enjoyment is conventionally limited to predefined attractions at predetermined locations. That is, the attractions are typically provided at predefined public locations which are generically and universally accessible to the visitors. In this regard, there is a need to improve the uniqueness of the attractions and to extend the availability of the attractions.

BRIEF DESCRIPTION OF THE DRAWINGS

The novel features which are characteristic of the systems, both as to structure and method of operation thereof, together with further objects and advantages thereof, will be understood from the following description, considered in connection with the accompanying drawings, in which embodiments of the systems and methods are illustrated by way of example. It is to be expressly understood, however, that the drawings are for the purpose of illustration and description only, and they are not intended as a definition of the limits of the systems and methods. For a more complete understanding of the disclosure, as well as other aims and further features thereof, reference may be had to the following detailed description of the disclosure in conjunction with the following exemplary and non-limiting drawings.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
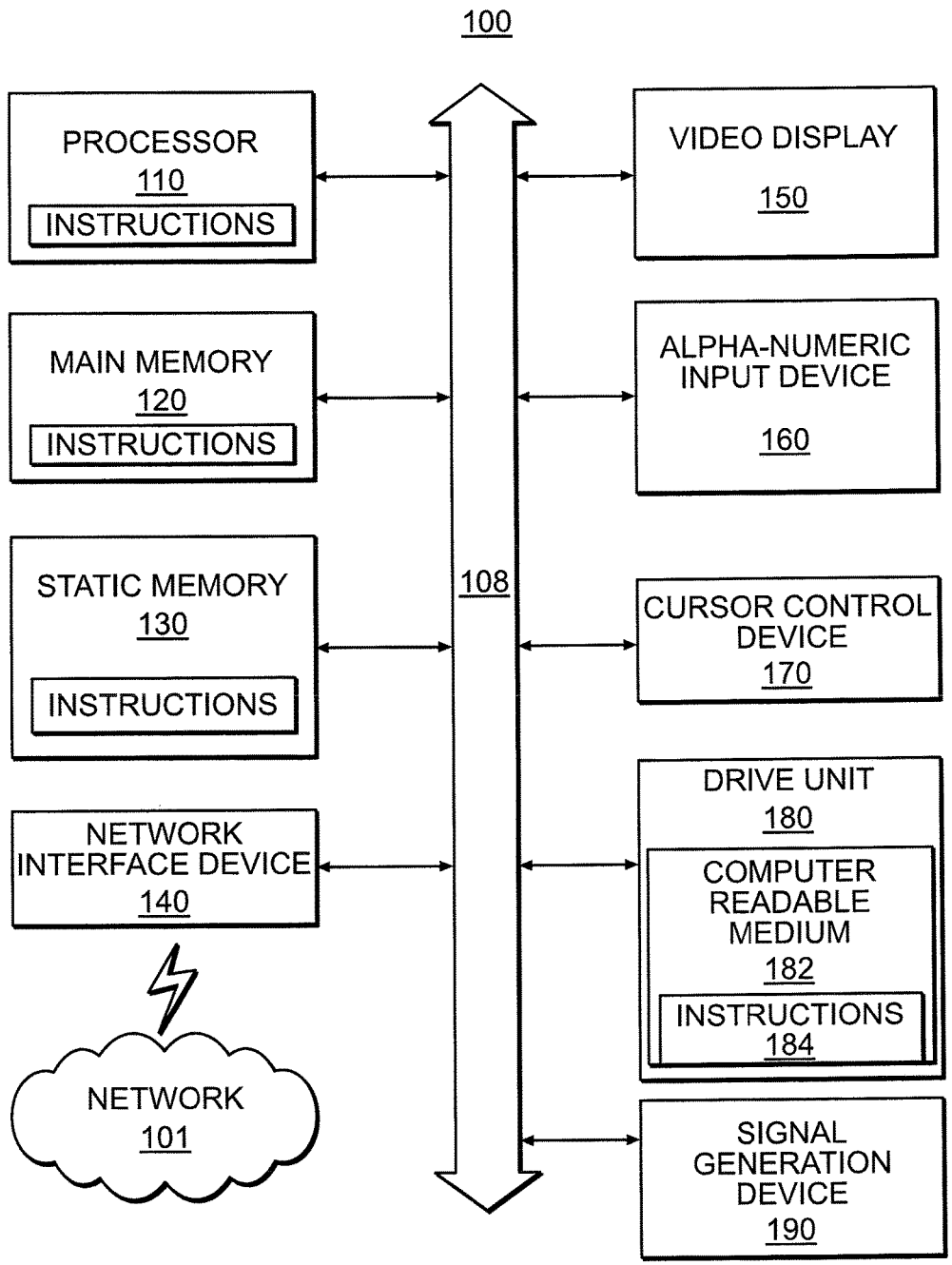
FIG. 1 shows an exemplary general computer system that includes a set of instructions for enhancing a service using virtual reality, according to an aspect of the present disclosure.

FIG. 1 is an illustrative embodiment of a general computer system, on which a method for enhancing a resort hotel service using virtual reality can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a set-top box (STB), a personal digital assistant (PDA), a global positioning satellite (GPS) device, a communications device, a control system, a camera, a web appliance, a network router, switch or bridge, virtual reality system, augmented reality system, a sensor, and monitor, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen, pad, augmented reality input device, visual input device, video input device, 3D input device, human eye position input device, haptic input device, body tracking device, acoustic tracking device, or a data glove. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

As will be described herein, the present disclosure uses virtual reality to enhance a guest experience of staying in a resort, theme park, amusement facility, or other venue. For example, when a guest checks-into or enters his or her room, a reservation of the guest may be confirmed. Thereafter, actual dimensions and objects, e.g., real-world coordinates of contours and shapes, in the room may be extracted. The confirmed reservation may be associated with a reference to a specific theme for the room, such as a jungle theme. The guest may specify the specific theme as an option when the reservation is made. Based on the specific theme, theme projection information is gathered for the room, e.g., an adventure game may have a chair in virtual reality software which is located at a same place as a chair is located in the room. A virtual reality projector projects virtual reality data, which the guest may observe, in alignment with the physical dimensions and objects in the room.

Accordingly, the present disclosure leverages audio/video technology to enable low-impact, flexible experiences that can be re-themed and targeted at specific audiences. The disclosure is designed to load in actual dimensions and objects in a hotel room. A projector and/or software recognize the room and loads entertainment adjusted to the room and objects, thus allowing the virtual reality experience to overlap physical reality.

The disclosure provides unique embodiments which allow resorts to customize virtual reality experiences, thereby enhancing the distinctiveness and uniqueness of the virtual reality experiences. The virtual reality experiences may further be extended from public spaces to private spaces, thereby expanding the domain in which the virtual reality experiences may be provided. The resort hotel or theme park may further sell packages of virtual reality entertainment, charging more for physical room layouts that are enhanced via the virtual reality experiences. As a result, money may be made and revenue may be increased by the virtual reality experiences.

Figure 2:
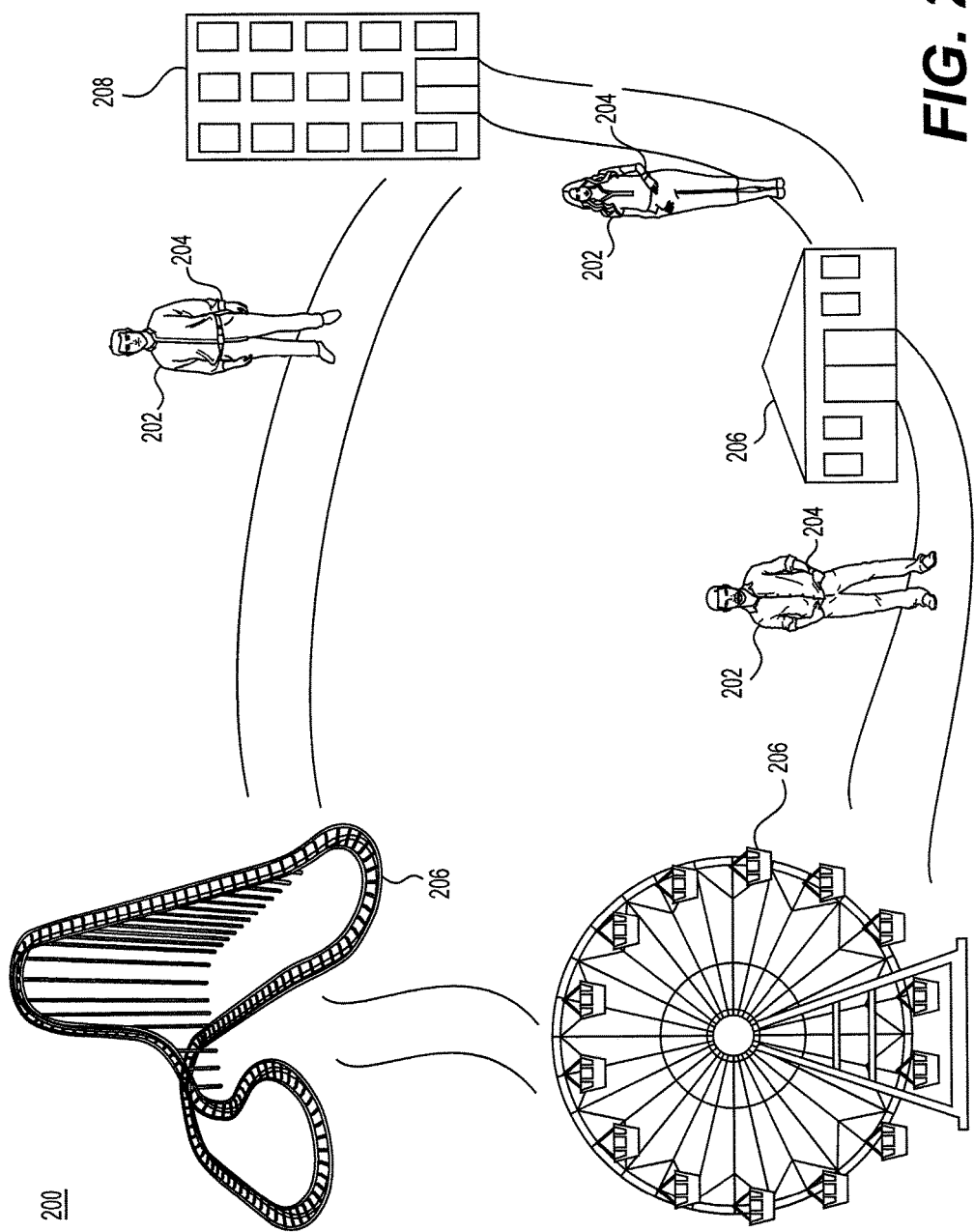
FIG. 2 shows an exemplary venue offering services which may be enhanced using virtual reality, according to an aspect of the present disclosure.

An exemplary embodiment of a venue for providing the virtual reality experiences is generally indicated in FIG. 2 at 200. The various methods and embodiments of the present disclosure described herein may be implemented locally within or externally of the venue 200. That is, some or all of the steps or features of the various methods and embodiments of the present disclosure may be implemented locally within the venue 200 while others or all of the steps or features of the various methods and embodiments of the present disclosure may be implemented externally of the venue 200.

The venue 200 is generally shown in FIG. 2 as being an amusement facility. Nevertheless, it is to be known and understood that the term "venue" may include any physical location, place, or event. For example, the venue 200 may be, but is not limited to, a resort, hotel, travel destination, theme park, amusement park, hiking park, casino, golf course, museum, campus, or travel destination. The venue 200 includes any facility, location, space, or place providing physical boundaries to fulfill one or more objectives of the present disclosure. Additional and alternative types of the venue 200 will be apparent to those of ordinary skill in the art.

The venue 200 may include one or more guests 202. The term "guest" is used in singular form herein for convenience. Nevertheless, it is to be known and understood that the plural form may be used interchangeably. Also, while the guest 202 is shown as being physically present at the venue 200, the guest 202 may additionally or alternatively be virtually present. It is to be further known and understood that the term "guest" includes any type of person or group of persons at any type of the venue 200. The term "guest" does require a particular relationship with the venue 200, such as a relationship where money is or is not exchanged or a relationship where an invitation is or is not extended. The term "guest" encompasses, among others, terms like "visitor," "person," "rider," "user," "patron," "client," etc. In this regard, the above-listed terms as well as other similar terms which are known and understood in the art may be used interchangeably herein.

The guest 202 may wear or be provided with a personal device 204. The personal device 204 may be the same or similar to the computer system 100 as described with respect to FIG. 1. Additionally or alternatively, the personal device 204 be or include any wearable technology, wireless device, tablet, fitness band, tracker, camera, smart glasses, Bluetooth™ device, smartphone, etc. In even further embodiments, the personal device 204 need not necessarily be an electronic device. For example, the personal device 204 may be or include a wristband, barcode, QR code, identification number, etc. Of course, the above-described examples are merely exemplary and are not limiting or exhaustive. The personal device 204, as further describe herein, may include any device or item which is known and understood to those of ordinary skill in the art to function or perform in accordance with the described features of the present disclosure.

The venue 200 may further include one or more attractions 206. The term "attraction" is also used in singular form herein for convenience. Nevertheless, it is to be known and understood that the plural form may be used interchangeably. The attraction 206 may refer to any physical or virtual item with which the guest 202 may interact. In alternative embodiments, the attraction 206 need not necessarily require interaction with the guest 202. For example, the attraction 206 may include an exhibit, show, event, item, etc. of which the guest 202 merely observes or spectates. The attraction 206 may be mobile or stationary, including but not limited to a theater, roller coaster, vehicle, game, ride, dining establishment, etc. Once again, the above-described examples are merely exemplary and are not limiting or exhaustive. The attraction 206 may include any additional or alternative places or things which are known and understood to those of ordinary skill in the art to function or perform in accordance with the described features of the present disclosure.

The venue 200 may even further include one or more buildings 208. The term "building" is further used in singular form herein for convenience. Nevertheless, it is to be known and understood that the plural form may be used interchangeably. The building 208 may comprise any physical structure or defined space. For example, the building 208 may be a hotel, office, restaurant, store, villa, home, club, suite, etc. The building 208 may additionally or alternatively be or include the attraction 206 as described herein. Once again, the above-described examples are merely exemplary and are not limiting or exhaustive. The building 208 may include any additional or alternative places or things which are known and understood to those of ordinary skill in the art to function or perform in accordance with the described features of the present disclosure.

The venue 200 may be owned, operated, run, managed, or controlled by an operator (not shown). The term "operator" may refer to any entity or agent acting on behalf of the venue 200 which may or may not affect satisfaction of the guest 202. The operator may include both non-profit entities or agents and for-profit entities or agents. As will be apparent from the present disclosure, the embodiments described herein may provide the operator, or operators, with a new revenue source having endless levels of content. The embodiments may provide a new level of in-room entertainment, as well as providing a platform technology extendable to other applications such as sleep enhancement, etc.

Figure 3:
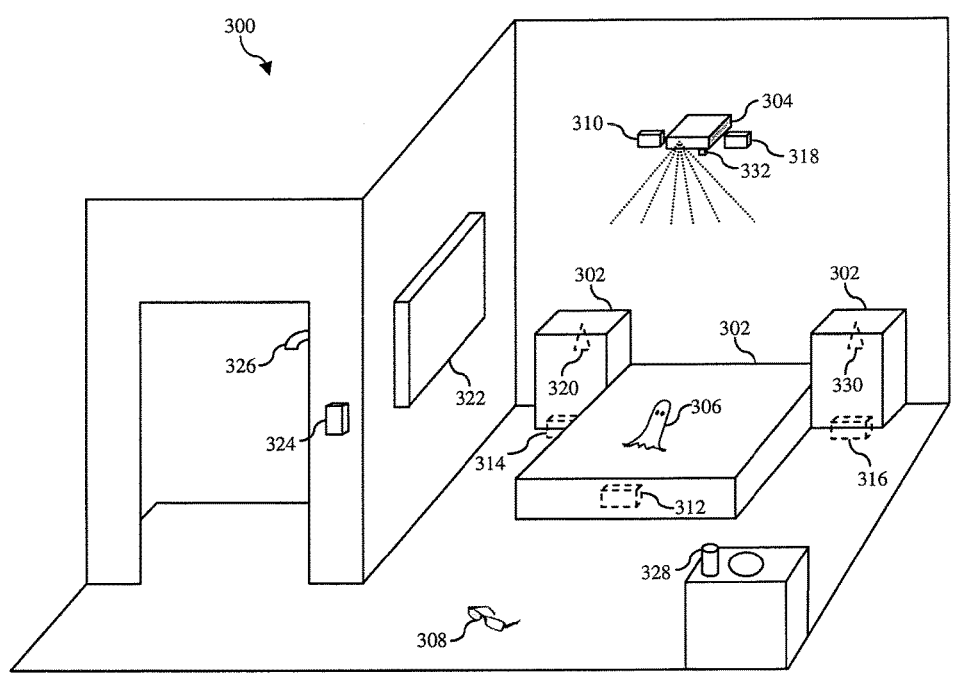
FIG. 3 shows an exemplary perspective view of a physical space in which a service may be enhanced using virtual reality, according to an aspect of the present disclosure.

FIG. 3 shows a non-limiting and exemplary embodiment of a physical space 300 in which a service may be enhanced using virtual reality. The physical space 300 may be or include any area or portion of the venue 200, attraction 206, or building 208. For example, in an embodiment in which the building 208 is a hotel, the physical space 300 may comprise a hotel room. The physical space 300 is generally referred to hereinafter as hotel room 300. Nevertheless, it is to be known and understood that the physical space 300 is not limited to being the hotel room 300. As discussed above, the physical space 300 may be or include any area or portion of the venue 200, attraction 206, or building 208. Moreover, in additional embodiments of the present application, the physical space 300 may include any defined physical space, regardless of whether being included within any venue, as described herein.

The hotel room 300 includes at least one object 302 which is to be enhanced with the virtual reality. The object 302 is shown and referred to hereinafter in singular form. Nevertheless, it is to be known and understood that the described embodiments may include plural objects 302. The object 302 may include, for example, a table, a chair, a bed, a nightstand, a television, a lamp, a picture, a wall, a ceiling, a floor, a door, or any additional tangible object, item, or thing located in the hotel room 300, or other defined physical space. That is, in the event that the defined physical space is not the hotel room 300, the object 302 may comprise additional or alternative objects which are within the defined physical space. For example, if the defined physical space is a booth or room in a restaurant, the object 302 may include a bench, a sconce, a chandelier, a piece of dinnerware, a table, etc. In a further exemplary embodiment, if the defined physical space is a cabana at a beach, pool, or club, the object 302 may include a pillow, a lounge chair, a table, a blanket, a towel, etc. Of course, the above-described examples and objects 302 are merely exemplary and are not limiting, exhaustive, or exclusive. The virtual reality described herein may be used to enhance any additional or alternative physical objects within a defined physical space within the scope of the present disclosure.

Figure 4:
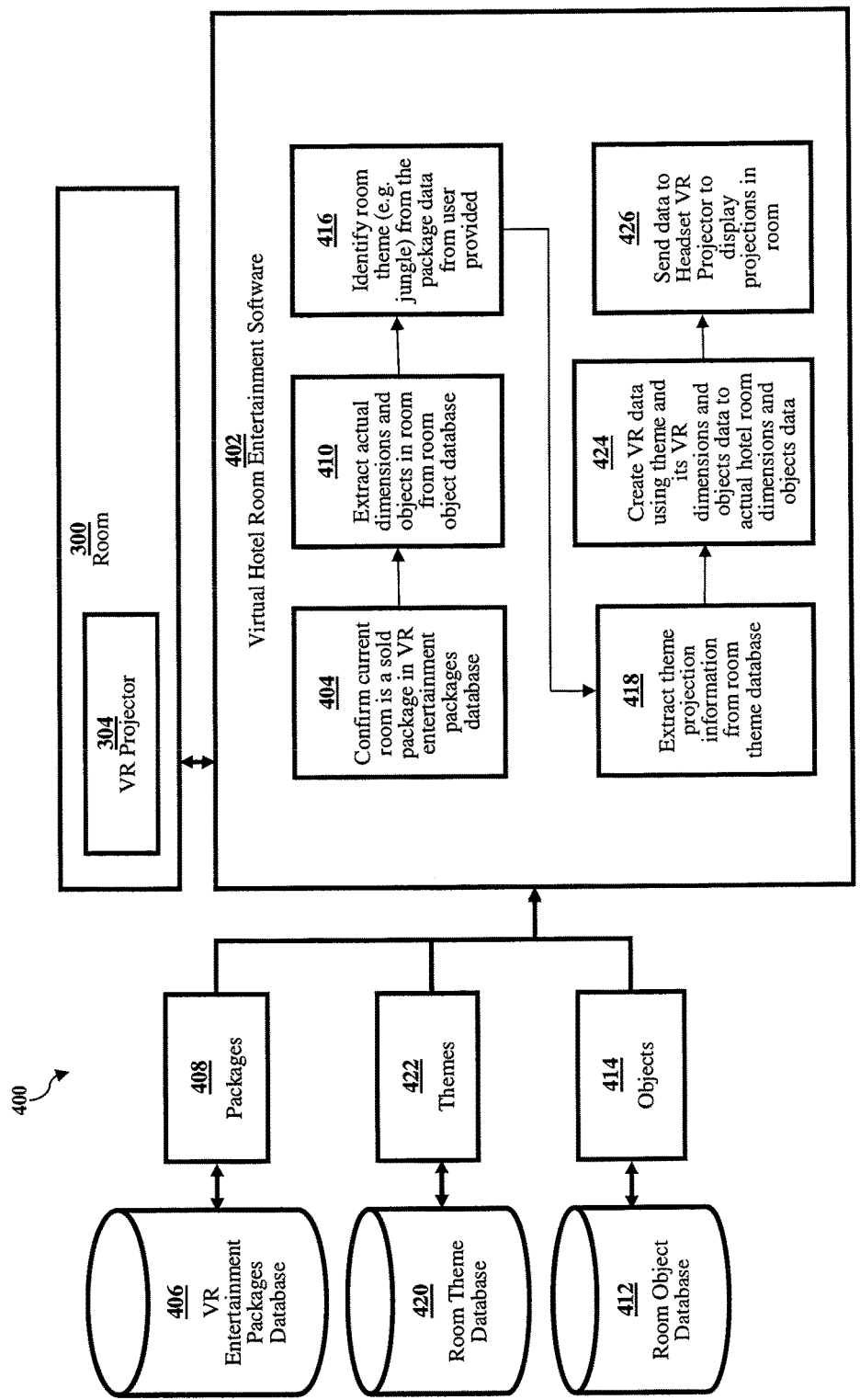
FIG. 4 shows an exemplary schematic of a system for enhancing a service using virtual reality, according to an aspect of the present disclosure.

An exemplary schematic of a system for enhancing a service using virtual reality is generally shown in FIG. 4 at 400. The service to be enhanced may be, for example, a hospitality or lodging service provided to a guest 202 in the event that the the defined physical space is the hotel room 300. The service is not, however, limited to hospitality and lodging services. For example, in the event that the defined physical space is the booth or the room in the restaurant or the cabana at the beach, pool, or club, the service may include a dining service or an entertainment service. Indeed, the service which is to be enhanced using the virtual reality may encompass any offering or provision of a service which is extended to the guest 202.

The system 400 of FIG. 4 includes virtual hotel room entertainment software 402. The virtual hotel room entertainment software 402 may be the same or similar to the one or more sets of instructions 184 as described with respect to FIG. 1. Additionally or alternatively, the virtual hotel room entertainment software 402 may comprise any software which is stored in any combination of the main memory 120, static memory 130, and drive unit 180 as described with respect to FIG. 1, and/or which is accessible via the network 101 as described with respect to FIG. 1. Also, while the virtual hotel room entertainment software 402 is generally described as including modules and being executable by, for example, the processor 110 of FIG. 1, the virtual hotel room entertainment software 402 may additionally or alternatively comprise functions, circuits, logic, or other components which are known and understood in the art for performing the features described herein.

The reservation confirmation module 404 acquires a reservation for the hotel room 300 which is made by the guest 202. The reservation may have been previously placed or be currently placed. The reservation may be placed by the guest 202 in-person, via telephone, electronically, via a third-party, or through any other means known and understood in the art. Also, while the guest 202 is generally described as having made a reservation for the service, e.g., the lodging service, a reservation need not necessarily be required. That is, a mere use of a defined physical space by the guest 202 may suffice. Indeed, any reservation, rental, lease, or other use of the defined physical space by the guest 202 is sufficient.

The reservation confirmation module 404 determines whether the acquired hotel room 300 is able to be combined with virtual reality as a virtual entertainment package. In this regard, the hotel room 300 may be predetermined or preselected as being combinable with virtual reality. Alternatively, the reservation confirmation module 404 may adaptively determine whether the hotel room 300 is able to be combined with virtual reality in real-time. For example, the reservation confirmation module 404 may determine whether any available virtual reality corresponds to a dimension, layout, configuration, or orientation of the hotel room 300. When virtual reality is available for the hotel room 300, the reservation confirmation module 404 may allow the guest 202 to preview the virtual reality. For example, the reservation confirmation module 404 may display an image of the hotel room 300 together with the virtual reality using a virtual reality headset. As such, the guest 202 may preview any available virtual reality options for the hotel room 300 before selecting a virtual reality option. Upon selection of a virtual reality option, the reservation confirmation module 404 may store the hotel room 300 and the selected virtual reality option in a first database 406, referred to hereinafter as a virtual reality entertainment packages database 406.

As an alternative to the reservation confirmation module 404 determining whether the acquired hotel room 300 is able to be combined with virtual reality and receiving a selection of the virtual reality option, the reservation confirmation module 404 may simply confirm whether the hotel room 300 is stored in the virtual reality entertainment packages database 406 in association with a virtual reality option. That is, the hotel room 300 may already be associated with the virtual reality option in the virtual reality entertainment packages database 406, and the reservation confirmation module 404 may merely confirm the association, such as during a check-in process.

The virtual reality option which is stored in the virtual reality entertainment packages database 406 in association with the hotel room 300 may comprise a designated room theme. The room theme may be, for example, a jungle, a desert, a beach, or any other climate, geographic location, or setting. The room theme may additionally or alternatively correspond to a movie, an animated character, or a fictional place. Plural room themes may be available for association with the hotel room 300, such that the guest 202 may individually customize the hotel room 300 to his or her preference. Each of the plural room themes may be available for all hotel rooms 300 of the building 208. Alternatively, certain ones of the room themes may only be available for certain ones of the hotel rooms 300 of the building 208. The room themes may be available for the hotel rooms 300 based on dimensions, layouts, configurations, orientations, contents, or combinations thereof of the hotel rooms 300. The room themes may further be available for the hotel rooms 300 based on a demand or availability of the hotel rooms 300. For example, a popular or desirable room theme may be paired with less desirable or highly available hotel rooms 300. According to such an embodiment, the desirability of such hotel rooms 300 may be increased and the availability decreased. The room themes may even further be available for the hotel rooms 300 based on a cost of the hotel rooms 300. For example, a popular or desirable room theme may be paired with more expensive hotel rooms 300. According to such an embodiment, the desirability of the more expensive hotel rooms 300 may be increased, thereby further increasing revenue.

The room themes may be packaged with the hotel rooms 300 as an add-on, such that revenue may again be increased via purchase of the room themes. The room themes may be provided on a per-night, per-day, hourly, per-activity, or per-trip basis. Also, the room themes may be provided on a fixed-fee basis, or the room themes may be provided on a variable-fee basis depending on a date, time, length, or event. Of course, these examples are merely exemplary and the room themes may additionally or alternatively be provided in accordance with any of the additional features described herein as well as those features commonly known and understood in the art. The room themes may also be packaged with the hotel rooms 300 based on further known and understood criteria such as, for example, being provided as a "comp", being provided in exchange for reward points, or being provided on special occasions. In any event, the room themes may be packaged with the hotel rooms 300 in the virtual reality entertainment packages database 406 in accordance with any fee or compensation structure as known and generally understood in the art.

Accordingly, the reservation confirmation module 404 may extract, store, or confirm the reserved or otherwise selected hotel room 300 and the designated or otherwise selected room theme as a virtual reality entertainment package 408. The virtual reality entertainment package 408 may be extracted from, stored in, or confirmed from the virtual reality entertainment packages database 406.

Upon acquisition or identification of the virtual reality entertainment package 408, a room extraction module 410 extracts data relating to a position and dimensions of the object 302 in the hotel room 300 which is associated with the virtual reality entertainment package 408. The room extraction module 410 may extract the data from a second database 412, referred to hereinafter as a room object database 412. In this regard, the position and the dimensions of the object 302 in the hotel room 300 may be predetermined or predefined. That is, the room object database 412 may store dimensions (e.g., room layouts) of a plurality of hotel rooms including the hotel room 300 and positions of each object 302 placed in the hotel rooms. The dimensions may comprise measurements, coordinates, floor plans, or any combination thereof. In this regard, the dimensions may be textual or graphic-based. However, in further embodiments of the system 400 as will be described below, at least one of the position and the dimensions of the object 302 in the hotel room 300 may be determined in real-time.

The position of the object 302 may include real-world coordinates of the object 302, a position of the object 302 relative to the dimensions of the hotel room 300, or a position of the objects 302 relative to a fixed reference point. The fixed reference point may coincide with or be, for example, a projector 304 which projects the virtual reality toward the object 302. The projector 304 is shown in FIG. 3 and generally depicted as being disposed on or mounted to an area of a ceiling (not shown) of the hotel room 300. The projector 304 is shown as being mounted to the ceiling in FIG. 5. When the fixed reference point corresponds to the projector 304, the position of the object 302 may be measured from or relative to the area of the ceiling of the hotel room 300 at which the projector 304 is disposed or mounted. Of course, the above-described examples are merely exemplary and non-limiting. The position of the object 302 may comprise any data which is capable of specifying a location of the object 302 and which is generally known and understood in the art. For example, the position of the object 302 may comprise latitude and longitude values. The position may further comprise a height component as the hotel room 300 may be vertically located in a floor of the building 208. In this regard, in another non-limiting and exemplary embodiment of the system 400, the position of the object 302 may relate to the geographic coordinate system.

The dimensions of the object 302 may include data or measurements relating to the shapes and contours of the object 302. The dimensions may be measured in two-dimensions or three-dimensions. The dimensions may also include any data or measurements relating to material or surface properties of the object 302, such as but not limited to, reflectance, absorption, roughness, smoothness, hardness, moisture, etc. In this regard, the virtual reality which is used to enhance the object 302 may be modified based on the material or surface properties of the object 302. Of course, the above-described examples are merely limiting and are not meant to be exclusive or exhaustive. The dimensions of the object 302 may include any other data or measurements which are known and understood in the art.

Accordingly, the room extraction module 410 may extract, acquire, determine, or measure the position and the dimensions of the object 302 as object data 414. The position and the dimensions of the object 302 may be extracted or acquired from the room object database 412. Additionally or alternatively, any of the position, dimensions, or portions or combinations thereof may be determined or measured by the room extraction module 410 in accordance with the additional embodiments described herein. In any event, the object data 414 is determined by the room extraction module 410. The object data 414, while generally being described as including the position and the dimensions of the objects 302, may further include dimensions and measurements relating to the hotel room 300, including a floor plan thereof, in additional embodiments of the system 400.

Further to extracting or determining the object data 414, a theme identification module 416 identifies the designated room theme of the hotel room 300 from the virtual reality entertainment package 408, and a theme extraction module 418 extracts or acquires data relating to the designated room theme of the hotel room 300. The theme identification module 416 may alternatively identify the designated room theme from data provided by the guest 202, or user, such as via the hotel room reservation. The theme extraction module 418 may extract the data from a third database 420, referred to hereinafter as a room theme database 422. While the virtual reality entertainment packages database 406, the room object database 412, and the room theme database 420 are referred to and shown in FIG. 4 as being separate databases, it is to be known and understood that any combination of the databases 406, 412, 420 may comprise a single database or be any of the memories described herein.

The theme extraction module 418 extracts or acquires the data relating to the room theme from the room theme database 420 as theme projection information 422. The theme projection information 422 includes image and projection information related to the virtual reality which is to be used to enhance the service, e.g., the hotel reservation. The theme projection information 422 may include image information, or video information, relating to items or images to be projected by the projector 304. The theme projection information 420 may further include mapping software as generally known and understood in the art for projecting or mapping the image information, or video information, onto the object 302. For example, the theme projection information 420 may indicate how to project a moving two-dimensional giraffe on a lampshade. Of course, such an exemplary is merely exemplary and is not to be limiting.

Figure 5:
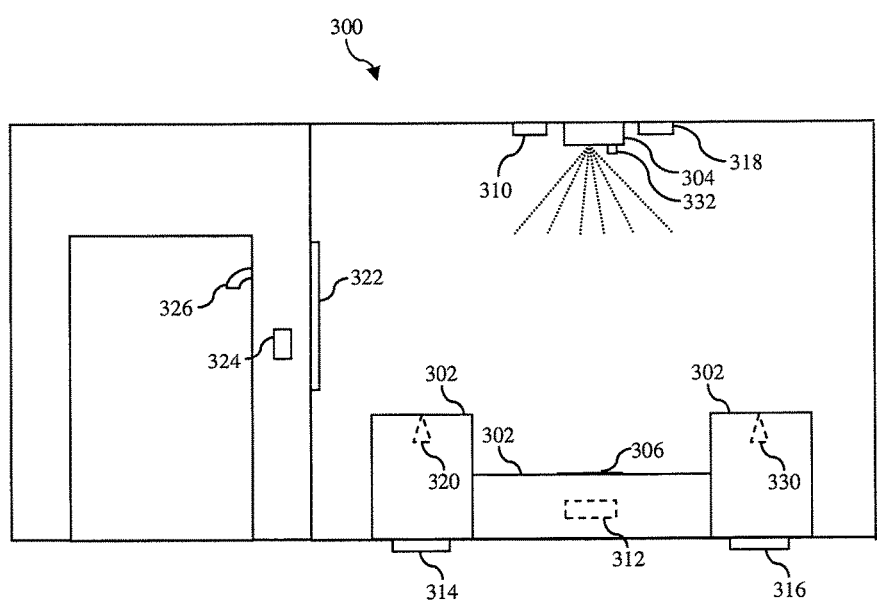
FIG. 5 shows an exemplary side view of a physical space in which a service may be enhanced using virtual reality, according to an aspect of the present disclosure.

A virtual reality creation module 424 obtains the object data 414 and the theme projection information 422 for creating contents based on the obtained object data 414 and theme projection information 422. The created contents by the virtual reality creation module 424 may include virtual reality data, image data, video data or sound data. A virtual reality transmission module 426 transmits the virtual reality data to the projector 304. The projector 304 is disposed in the hotel room 300 and is configured to project the virtual reality data in alignment or correspondence with the object 302. The virtual reality data is configured to display virtual reality content 306 which is visible to the guest 202 in alignment with the object 302 in the hotel room 300 and the physical dimensions thereof. A single piece of virtual reality content 306 is shown in FIG. 3 and FIG. 5. Nevertheless, it is to be known and understood that the virtual reality content 306 may comprise plural pieces. The virtual reality content 306 may comprise characters, animals, plants, landscapes, or any other type of image or content which is generally known and understood in the art. In addition, the virtual reality transmission module 426 may transmit the contents created by the virtual reality creation module 424, or information thereof, to a speaker (not shown), an entertainment system 322, a thermostat 324, a faucet 326, etc. discussed below.

The projector 304 may project and display the virtual reality content 306 such that it may be visible to the guest 202 via unaided vision, via aided vision, or via any combination thereof. In this regard, the projector 304 may project the virtual reality content 306 via visible or invisible wavelengths. The projector 304 may also project the virtual reality content 306 in two-dimensions or in three-dimensions. The two-dimension content may include a visible image or video. The visible image or video can be projected on the object 302, walls of the hotel room 300, or at any other location by the projector 304. When the virtual reality content 306 is projected in three-dimensions, the virtual reality content 306 may be visible to the guest 202 with or without the use of a headset. That is, the three-dimensional virtual reality content 306 may be visible to the user through the use of a headset 308, as shown in FIG. 3, or without the use of a headset. While the headset 308 is shown as being a pair of glasses in FIG. 3, those of ordinary skill in the art appreciate that a conventional virtual reality headset may additionally or alternatively be used. In summary, the projector 304 may project the virtual reality content 306 in alignment with the hotel room 300 and/or the object 302 in accordance with any known and understood methods in the art. For example, the projector 304 may apply a 3D modeling tool such as, for example, PointEditor, and use the object data 414 and the theme projection information 422 to create and display the virtual reality content 306. In addition, the projector 304 may include a speaker (not shown) that outputs sounds with respect to the content 302. For instance, if the content 302 includes a character, the speaker, as a sound output, may output the character's voice as if the character speaks. The speaker may be integral with the projector 304 or may be another device distinct from the projector 304 and be disposed on or mounted to an area of a ceiling (not shown), a wall, or the object 302 of the hotel room 300. In this case, the speaker may be linked to the projector 304 via a network. Thereby the speaker works in synchronization with the projector 304 for outputting sounds at a same time as displaying the content 302 by the projector 304.

Accordingly, the system 400 uses virtual reality to enhance an experience of the guest 202 of staying in a resort or the hotel room 300. When the guest 202 enters the hotel room 300, the virtual hotel room entertainment software 402 confirms a reservation stored in the virtual reality entertainment packages database 406. The software 402 extracts actual dimensions and objects (e.g., real-world coordinates, contours, shapes, etc.) in the hotel room 300 from the room object database 412. The confirmed reservation (e.g., the virtual reality entertainment package 408) has associated with it a reference to a specific theme for the hotel room 300, that the guest 202 picks, such as a jungle theme, an option which may be specified when the guest 202 made the reservation. Based on the specific theme, the virtual hotel room entertainment software 402 gathers the theme projection information 422 from the room theme database 420 (e.g., an adventure game that has a chair in the virtual reality software located at the same place a chair is located in the hotel room 300). The virtual reality content 306 that the guest 202 sees is aligned with the physical dimensions of the objects 302 in the hotel room 300.

Figure 6:
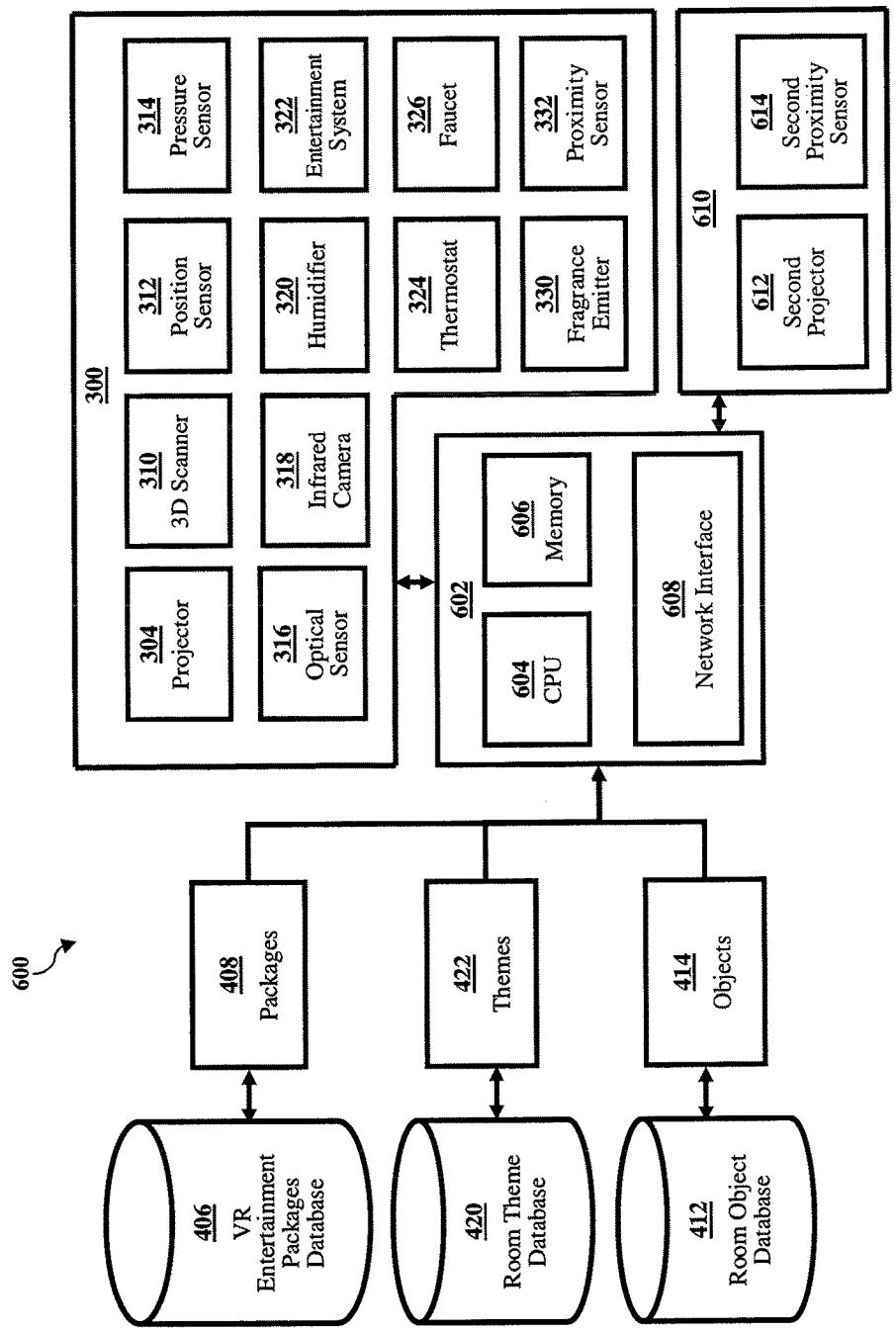
FIG. 6 shows an exemplary schematic of a further system for enhancing a service using virtual reality, according to an aspect of the present disclosure.

A further embodiment of a system for enhancing a service using virtual reality is generally shown in FIG. 6 at 600. In this regard, the features of the system 400 of FIG. 4 and the features of the system 600 of FIG. 6 may be used interchangeability in any combination thereof. The service to be enhanced by the system 600 of FIG. 6 may be the same or similar to the systems as described with respect to the system 400 of FIG. 4.

The system 600 includes a computer system 602 which may be the same or similar to the computer system 100 as described with respect to FIG. 1. Specifically, the computer system 602 may include any combination of components as described with respect to the computer system 100. For example, as shown in FIG. 6, the computer system 602 includes a processor 604, e.g., CPU, and a memory 606. The processor 604 may be the same or similar to the processor 110 as described with respect to the system 100 of FIG. 1. The memory 606 may be the same or similar to any of the memories 120, 130, and 182 as described with respect to the system 100 of FIG. 1. For example, the memory 606 may store instructions that, when executed by the processor 604, cause the processor 604 to perform operations as described herein.

The processor 604 may identify an area of a service to be enhanced. The area and the service are again described as being the hotel room 300 of the lodging service, with a designated theme for enhancing the hotel room 300 including a room theme. While the area, service, and theme are again described as being the hotel room 300, the lodging service, and the room theme, it is to be known and understood that the system 600 is not limited to such features and may include any additional or alternative areas, services, and themes as described herein or as generally understood in the art. The processor 604 may identify the hotel room 300 and the room theme in a similar manner as discussed with respect to the system 400 of FIG. 4.

The processor 604 may further identify at least one object 302 in the hotel room 300, with the object 302 to be enhanced using the virtual reality. The processor 604 may also acquire a position and dimensions of the object 302 in the hotel room 300. The processor 604 may identify the object 302 and acquire the position and the dimensions of the object 302 via the room object database 412 as described with respect to the system 400 of FIG. 4. In this regard, the processor 604 may identify the object 302 and acquire the position and the dimensions of the object 302 via a network interface 608 which communicates with the room object database 412. The network interface 608 may be the same or similar to the network interface device 140 of FIG. 1.

In further embodiments of the system 600, the processor 604 may acquire at least one of the position and the dimensions of the object 302 in real-time. For example, when the hotel room 300 and the room theme are identified, the processor 604 may compute or otherwise determine at least one of the position and the dimensions of the object 302.

In an embodiment of such a system 600, a three-dimensional scanner or camera 310 may be disposed in the hotel room 300. Such a three-dimensional scanner or camera 310 is shown in FIG. 3 and FIG. 5. The three-dimensional scanner or camera 310 may scan the hotel room 300 for the position and the dimensions of the object 302 in real time pursuant to an instruction from the processor 604 sent via the network interface 608. For example, when a guest comes to a front desk of the hotel for check-in, a computer operated by a front desk person may transmit a signal indicating the guest has checked-in to the processor 604. When the processor 604 receives the signal, the processor 604 may send the instruction for scanning the hotel room 300 to the three-dimensional scanner or camera 310. According to such an embodiment, even when the object 302 is moved within the hotel room 300, the position and the dimensions of the object 302 may be accurately determined.

The three-dimensional scanner or camera 310 is shown in FIG. 3 and FIG. 5 as being disposed on the ceiling of the hotel room 300 adjacent the projector 304. According to such a feature, when the three-dimensional scanner or camera 310 is disposed adjacent or proximate to the projector 304, the position and the dimensions of the object 302 relative to the projector 304 may be easily determined. Alternatively, the three-dimensional scanner or camera 310 may be disposed in a fixed, predetermined relationship with the projector 304 such that the position and the dimensions of the object 302 relative to the projector 304 may still be determined. Of course, the above-described embodiments are merely exemplary and the three-dimensional scanner or camera 310 may be disposed at any location within the hotel room 300 in further embodiments of the system 600.

In additional embodiments of the system 600, a position sensor 312 may be disposed in, mounted on, or fixed to the object 302. The position sensor 312 may measure at least the position of the object 302. The position sensor 312 may be an absolute position sensor, such as a global positioning system (GPS) sensor. In such an embodiment, the position of the object 302 relative to the dimensions of the hotel room 300 may be determined, and the position of the object 302 relative to the projector 304 may even be determined when the projector 304 is at a fixed, predetermined location in the hotel room 300. Additionally or alternatively, the position sensor 312 may be a relative sensor, such as a displacement sensor. In such embodiments, the position of the object 302 relative to the projector 304 may be determined regardless of whether the projector 304 is at the fixed, predetermined location in the hotel room 300. In any event, the above-described embodiments further enable the position of the object 302 to be accurately determined even when the object 302 is moved within the hotel room 300.

In even further embodiments of the system 600, a pressure sensor 314 and/or an optical sensor 316 may be disposed in the hotel room 300. As shown in FIG. 3 and FIG. 5, the pressure sensor 314 may be disposed, for example, along a floor of the hotel room 300 to determine at least the position of the object 302. The optical sensor 316 may further be disposed along the floor of the hotel room 300 to determine at least the position of the object 302. The pressure sensor 314 and the optical sensor 316 may additionally or alternatively be disposed in any further locations of the hotel room 300, even including being disposed on the object 302. In such embodiments, the pressure sensor 314 and/or the optical sensor 316 may be used to at least determine an orientation of the object 302 or whether the object is upright. Of course, the above-described examples are merely limiting and are not exclusive or exhaustive. The pressure sensor 314 and/or the optical sensor 316 may be used in accordance with any additional or alternative means as generally known and understood in the art.

Accordingly, the above-described scanner/camera and sensors 310, 312, 314, and 316 may be disposed in the hotel room 300 individually or in combination to detect, determine, or measure at least one of the position and the dimensions of the object 302 within the hotel room 300 in real-time. The scanner/camera and sensors 310, 312, 314, and 316 may be controlled by and/or communicate with the processor 604 via the network interface 608 for informing the computer system 602 of the position and/or the dimensions of the object 302. The scanner/camera and sensors 310, 312, 314, and 316 may be used in addition to or as an alternative to the room object database 412. For example, in an embodiment in which the scanner/camera and sensors 310, 312, 314, and 316 are used in combination with the room object database 412, the room object database 412 may store the dimensions of the object 302 or update the dimensions of the object 302 stored in the room object database 402. Nevertheless, any combination of the scanner/camera and sensors 310, 312, 314, and 316 may be used to determine a position and/or orientation of the object 302 within the hotel room 300 in real-time, such that the object 302 may be located even when moved by the guest 202 or a housekeeper.

After, before, or while acquiring the position and the dimensions of the object 302 in the area 300, the processor 604 extracts data corresponding to the room theme identified in association with the hotel room 300. In this regard, similar to the system 400 of FIG. 4, the system 600 may include the room theme database 420 which stores theme projection information for each of a plurality of room themes. The processor 604 may extract the theme projection information 422 corresponding to the designated room theme from the room theme database 420.

Also similar to the system 400 of FIG. 4, the processor 604 causes the projector 304 disposed in the hotel room 300 to project the virtual reality content 306 on the object 302 using a three-dimensional modeling tool based on the position and the dimensions of the object 302 and the theme projection information 422 corresponding to the room theme. In an example, the processor 604 may cause the projector 304 to project the virtual reality content 306 when receiving the signal, described above, indicating the guest has checked-in at the front desk from the computer operated by the front desk person. In another example, the processor 604 may cause the projector 304 to project the virtual reality content 306 when detecting an opening of a door of the room 300. In this regard, the door may be locked by an electronic lock which is connected to a network and can be opened by electronic key (e.g., a card key). Thus the processor 604 may monitor an open/closed state of the electronic lock installed on a door for sending the instruction to the projector 304. The three-dimensional modeling tool may comprise any software, algorithm, circuitry, logic, or other implementation which is generally known and understood in the art for implementing the features of the projector 304 described herein.

According to an embodiment of the system 600, an infrared camera 318 may be disposed in the hotel room 300. The infrared camera 318 may be integrated with or separate from the projector 304. The processor 604 may control the infrared camera 318 to detect a predetermined relationship between the guest 202 in the hotel room 300 and the virtual reality content 306 projected on the object 302. The predetermined relationship may include the guest being adjacent to or interacting with the virtual reality content 306. In this regard, the infrared camera 318 may be disposed adjacent or proximate to the projector 304, such that the interaction between the guest 202 and the virtual reality content 306 projected by the projector 304 may be easily determined. The infrared camera 318 may detect the interaction of the guest 202 with the virtual reality content 306 unaided. Alternatively, the guest 202 may be provided with the personal device 204 as described with respect to FIG. 2, which is configured to be detected by the infrared camera 318.

When the processor 604 detects the predetermined relationship between the guest 202 and the virtual reality content 306 projected on the object 302, the processor 604 may modify the virtual reality content 306 projected on the object 302. According to such an embodiment, the virtual reality content 306 may be interactive, thereby further enhancing enjoyment of the guest 202.

In further embodiments of the system 600, a humidifier 320 may be disposed in the hotel room 300. The humidifier 320 may be disposed in the hotel room 300 in a predetermined relationship with the object 302 and the projector 304. For example, the humidifier 520 may be disposed in the predetermined relationship such that it is configured to release water vapor between the object 302 and the projector 304. While the humidifier 320 is described as releasing water vapor, it is to be known and understood that the humidifier 320 may similarly be interpreted as a fog machine which releases fog. The humidifier 320 may even further be interpreted as a smoke machine which emits smoke. Indeed, the humidifier 320 may be interpreted as any machine or device which emits particles into an atmosphere of the hotel room 300. The fog machine, the smoke machine, or any other machine or device which emits particles may similarly be disposed in the predetermined relationship such that they are configured to release the fog, the smoke, or the other particles between the object 302 and the projector 304. In such embodiments, the projector 304 projects the virtual reality content 306 on the water vapor, the fog, the smoke, and/or the other particles. As a result, an improved three-dimensional or holographic image may be produced as the virtual reality content 306. Of course, the above-described embodiments are merely exemplary and not limiting. The humidifier 320, or other devices, may additionally or alternatively be disposed in different predetermined relationships for producing different effects.

As shown in FIG. 3 and FIG. 5, the hotel room 300 may include an entertainment system 322, such as a television or a display. The entertainment system 322 may include video-on-demand functionality, streaming content, over-the-air content, network content, video game content, or any additional programming which is generally known and understood in the art. In embodiments of such system 600 including the entertainment system 322, the service to be enhanced using the virtual reality may relate to the entertainment system 322. That is, the processor 604 may identify an entertainment system selection based on an input to the entertainment system 322 or other content request, as generally known and understood in the art. Based on the entertainment system selection, the system 600 may determine that the service to be enhanced using the virtual reality relates to the entertainment system 322. The processor 604 may identify the room theme based on a content of the entertainment system selection or entertainment provided by the entertainment system 322. For example, if the guest 202 selects content on the entertainment system 322 having a winter or frozen environment, the processor 604 may acquire a designated theme from the room theme database 420 which corresponds to the winter or frozen environment. The processor 604 may thereafter acquire the position and the dimensions of the object 302 in the hotel room 300, and project the virtual reality content 306 on the object 302 in alignment with the object 302 and in correspondence with the content of the entertainment system 322. According to such an embodiment, the virtual reality content 306 may add an interactive aspect to the content of the entertainment system 322 and/or provide a setting in the hotel room 300 which corresponds to the content of the entertainment system 322. Of course, additional embodiments and advantages of the above-described embodiment are within the scope of the present disclosure.

In an even further embodiment of the system 600, also as shown in FIG. 3 and FIG. 5, the hotel room 300 may include a thermostat 324. In such an embodiment, the processor 604 may control a setting of the thermostat 324 in accordance with the designated theme. For example, in an embodiment in which the room theme corresponds to a jungle, the thermostat 324 may be set to a higher temperature than in an embodiment in which the room theme corresponds to a snowy mountain. Also, in the embodiment described in the preceding paragraph in which the designated theme is selected based on the content of the entertainment system 322, the setting of the thermostat 324 may be set in accordance with the content of the entertainment system 322. For example, when the content relates to the winter or frozen environment, the setting of the thermostat 324 may be adjusted to decrease the temperature. In this regard, the temperature of the thermostat 324 may be set to a predetermined value, or the temperature may be decreased from a current value by a predetermined amount. In the latter embodiment, the guest 202 may be permitted to establish a baseline temperature from which the setting of the thermostat 324 may be adjusted. The setting of the thermostat 324 may be adjusted based on a constant amount, or the setting of the thermostat 324 may be variably adjusted in accordance with the content of the entertainment system 322. Of course, the above-described embodiments are merely exemplary and are not exhaustive or exclusive.

In an even further embodiment of the system 600, also as shown in FIG. 3 and FIG. 5, the hotel room 300 may include a faucet 326. The faucet 326 may include light elements which are configured to emit light of different colors, a nozzle which is configured to emit different spray patterns, and/or a nozzle which is configured to emit different water pressures. In such an embodiment, the processor 604 may control the faucet 326 to change at least one of a color of the light emitted by the light elements, a spray pattern of the faucet 326, or a water pressure of the faucet 326 in accordance with the room theme. For example, in an embodiment in which the room theme corresponds to a jungle, the faucet 326 may be controlled to emit light of a green color. Also, in the embodiment described above in which the designated theme is selected based on the content of the entertainment system 322, the faucet 326 may be controlled in accordance with the content of the entertainment system 322. Of course, the above-described embodiments are merely exemplary and are not exhaustive or exclusive.

As shown in FIG. 3, the hotel room 300 also may include a room or meal delivery service 328. The meal delivery system 316 may deliver meals which are prepared within the building 208 which contains the hotel room 300 or which are prepared externally of the building 208. Also, while the room or meal delivery service 328 is referenced as including a delivery, it should be known and understood that the room or meal delivery service 328 does not require a delivery and may comprise an in-room or mini-bar service. In any event, the room or meal delivery service 328 generally provides consumables to the guest 202. In such system 600 including the room or meal delivery service 328, the service to be enhanced using the virtual reality may relate to the room or meal delivery service 328. That is, the processor 604 may identify an order or selection placed through the room or meal delivery service 328. Based on the order or selection, the system 600 may determine that the service to be enhanced using the virtual reality relates to the room or meal delivery service 328. The processor 604 may identify the room theme based on the order or selection of consumables through the room or meal delivery service 328. For example, if the guest 202 selects a Spanish dish or item, the processor 604 may acquire a designated theme from the room theme database 420 which corresponds to a fiesta or other Spanish environment. As an additional example, if the guest 202 makes an order or selection for two, the processor 604 acquire a designated theme from the room theme database 420 which corresponds to a romantic or sentimental environment. The processor 604 may thereafter acquire the position and the dimensions of the object 302 in the hotel room 300, and project the virtual reality content 306 on the object 302 in alignment with the object 302 and in correspondence with the order or selection from the room or meal delivery service 328. According to such embodiments, the virtual reality content 306 may add an interactive aspect to the room or meal delivery service 328 and/or provide a setting in the hotel room 300 which is appropriate for the order or selection. Of course, additional embodiments and advantages of the above-described embodiments are within the scope of the present disclosure.

In further embodiments of the system 600, a fragrance emitter 330 may be disposed in the hotel room 300. In such embodiments, the processor 604 may control the fragrance emitter 330 to emit a fragrance in accordance with the room theme. For example, in embodiments in which the room theme relates to a beach, the fragrance emitter 522 may be controlled to emit an ocean or salty scent. Such a feature further improves on the uniqueness and interactivity of the system 600 by engaging and interacting with additional senses of the guest 202. Of course, the above-described example is merely exemplary and is not limiting or exhaustive.

In even further embodiments of the system 600, a proximity sensor 332 may be disposed in the hotel room 300. The proximity sensor 332 may be configured detect a presence of the guest 202 in the hotel room 300. The proximity sensor 332 may be a motion sensor or any other sensor which is commonly known and understood in the art for detecting a presence of an individual. For example, the proximity sensor 332 may detect the presence of the guest 202 via the personal device 204 worn by the guest 202. According to such embodiment, the processor 604 may control the projecting of the virtual reality content 306 by the projector 304 on the object 302 based on a detection of the presence of the guest 202 in the hotel room 300 by the proximity sensor 332. As such, the system 600 need not necessarily project the virtual reality content 306 on the item 302 when the guest 202 is not present.

In an extension or alternative embodiment of the system 600 which includes the proximity sensor 332, the venue 200 may include an additional area 610 different than the hotel room 300. The additional area 610 may be, for example, one of the attractions 206. A second projector 612 may be disposed in the additional area 610. A second proximity sensor 614 may also be disposed in the additional area 610. The second proximity sensor 614 may be further configured to detect the presence of the guest 202 in the additional area 610, similar to the proximity sensor 332 in the hotel room 300. Accordingly, the processor 604 may control a theme of the additional area 610, e.g., one of the attractions 206, in accordance with the room theme based on the detection of the presence of the guest 202 in the additional area 610 by the second proximity sensor 614. According to such an embodiment, the unique room theme selected by the guest 202 may be extended into the venue 200 and to at least one of the attractions 206, thus further providing a sense of distinctiveness to the guest 202. The unique room theme may be applied to each of the hotel room 300 and the additional area 610, or different room themes may also be applied to the hotel room 300 and the additional area 610 in further embodiments of the system 600.

Figure 7:
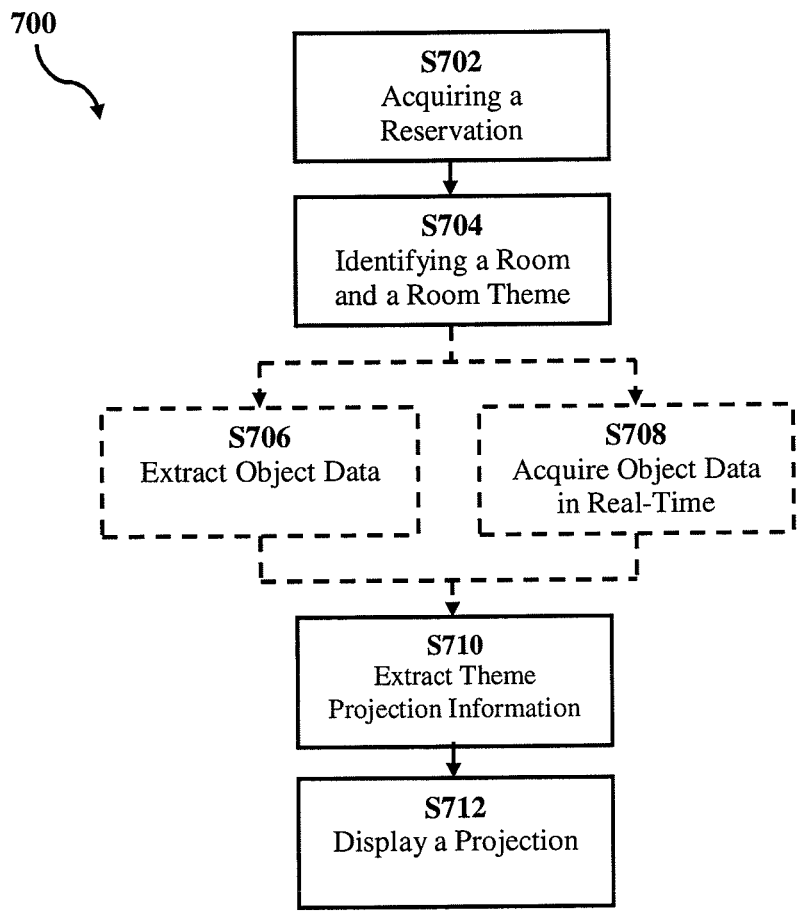
FIG. 7 shows an exemplary method for enhancing a service using virtual reality, according to an aspect of the present disclosure.

The present disclosure further provides various methods which may be implemented by the above-described devices and systems, as well as various computer programs and computer-readable media which may be executable by the above-described devices and systems for performing the disclosed features. An exemplary method for enhancing a resort hotel service using virtual reality is generally indicated by FIG. 7 at 700. Again, while the service is generally described as relating to the lodging or hospitality service and an area of the service which is to be enhanced is described as being a hotel room, it is to be known and understood that the method 700 is not limited to such services and areas and may include additional services and areas as described herein or as generally understood in the art.

The method 700 acquires a reservation for the hotel room at S702. The acquired reservation includes information relating to a guest, for example, a name of the name, a room type designated by the guest and a room theme designated by the guest. The hotel room and a designated room theme are identified from the reservation at S704. Data relating to a position and dimensions of an object in the hotel room may be extracted from a database at S706. Additionally or alternatively, any combination of the position and the dimensions of the object, as well as the dimensions of the hotel room and/or walls thereof, in the hotel room may be determined in real-time at S708. The position and/or the dimensions of the object may be determined in real-time using any combination of a three-dimensional scanner or camera located in the hotel room, a position sensor located in the hotel room, a pressure sensor located in the hotel room, an optical sensor located in the hotel room, or any additional or alternative sensor or device which is known and understood in the art.

Theme projection information corresponding to the room theme designated by the guest is extracted from a database at S710. Virtual reality content, image content, or video content is projected in the hotel room based on the position and the dimensions of the object in the hotel room and the theme projection information at S712. The virtual reality content is projected using a projector and a three-dimensional modeling tool. The virtual reality content is projected in alignment or correspondence with the object in the hotel room. A size of the virtual reality content, the image content, or the video content may be adjusted based on the position and dimensions of the object such that the size fits into the object. For example, if the size of the image content or the video content projected on the object is larger than a size of a projected surface of the object, the image content or the video content may be projected by reducing the size thereof.

Figure 8:
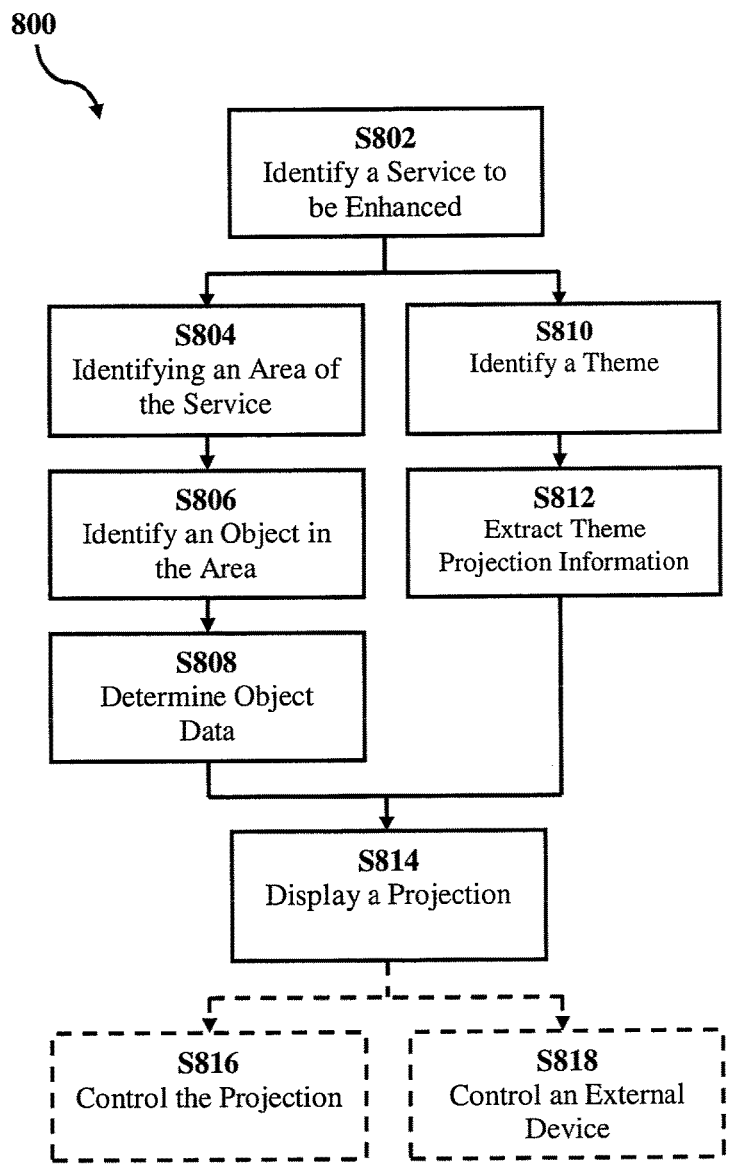
FIG. 8 shows an exemplary method for enhancing a service using virtual reality, according to an aspect of the present disclosure.

A further exemplary method for enhancing a service using virtual reality is generally indicated by FIG. 8 at 800.

In the method 800, a service to be enhanced is identified at S802. An area of the service to be enhanced using the virtual reality is identified at S804. The area is a defined physical space. An object in the area is identified at S806, and a position and dimensions of the object in the area is determined at S808. Before, after, or in parallel with S804-S808, a theme for enhancing the service is identified at S810, and theme projection information corresponding to the theme is extracted from a database at S812. Virtual reality content is projected on the object in the room using a three-dimensional modeling tool based on the position and the dimensions of the object and the theme projection information at S814.

Thereafter, in embodiments of the method 800, the virtual reality content may be controlled at S816. For example, the virtual reality content may be controlled based on a guest interacting with the virtual reality content. In additional or alternative embodiments of the method 800, an external device in the room may be controlled in accordance with the virtual reality content and/or the theme projection information at S818. The external device may be, but is not limited to, a humidifier, an entertainment system, a thermostat, a faucet, a fragrance emitter, etc.

The above-described methods 100 and 800 are merely exemplary and are not limiting. Even further methods for enhancing a service using virtual reality may be provided by the present disclosure in accordance with any of the features described herein.

Although methods, systems, and media for enhancing a service using virtual reality have been described with reference to several exemplary embodiments, it is understood that the words that have been used are words of description and illustration, rather than words of limitation. Changes may be made within the purview of the appended claims, as presently stated and as amended, without departing from the scope and spirit of enhancing a service using virtual reality in its aspects. Although the methods, systems, and media for enhancing the service using the virtual reality have been described with reference to particular means, materials and embodiments, the enhancement of the service using the virtual reality is not intended to be limited to the particulars disclosed; rather the enhancement of the service using the virtual reality extends to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards such as (Wi-Fi, Bluetooth, RFID, Cellular, GPS, and NFC) represent examples of the state of the art. Such standards are periodically superseded by more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

According to an aspect of the present disclosure, a method for enhancing a resort hotel service using virtual reality is provided. The method acquires a reservation for a hotel room with a designated room theme and stores the hotel room reservation with the designated room theme in a first database. The method extracts data relating to dimensions of and objects in the reserved hotel room. The data is extracted from a second database using a virtual hotel room entertainment system. The method also extracts theme projection information corresponding to the designated room theme. The theme projection information is extracted from a third database using the virtual hotel room entertainment system. The method displays a projection in the reserved hotel room, using a projector and a three-dimensional modeling tool, based on the extracted data relating to the dimensions of and the objects in the reserved hotel room and the extracted theme projection information.

According to another aspect of the present disclosure, a system for enhancing a service using virtual reality is provided. The system includes a projector disposed in an area, a database that stores theme projection information for each of a plurality of designated themes for enhancing the service using the virtual reality, a processor, and a memory. The memory stores instructions that, when executed by the processor, cause the processor to perform operations. The operations include identifying the area of the service to be enhanced using the virtual reality and one of the plurality of designated themes, and identifying at least one object in the area. The at least one object is to be enhanced using the virtual reality. The operations further include acquiring a position and dimensions of the at least one object in the area, and extracting, from the database, the theme projection information corresponding to the one of the plurality of designated themes. The operations also include projecting, with the projector, the virtual reality on the at least one object using a three-dimensional modeling tool based on the position and the dimensions of the at least one object and the theme projection information corresponding to the one of the plurality of designated themes.

According to yet another aspect of the present disclosure, the system further includes a second database which stores the position and the dimensions of the at least one object. The processor acquires the position and the dimensions of the at least one object from the second database.

According to a further aspect of the present disclosure, the acquiring of the position and the dimensions of the at least one object includes determining at least one of the position and the dimensions of the at least one object in real-time.

According to still a further another aspect of the present disclosure, the system further includes a three-dimensional scanner disposed in the area. The processor determines the at least one of the position and the dimensions of the at least one object in real-time using the three-dimensional scanner.

According to another aspect of the present disclosure, the system further includes a position sensor disposed on the at least one object. The processor determines at least the position of the at least one object in real-time using the position sensor.

According to yet another aspect of the present disclosure, the system further includes a pressure sensor disposed in the area. The processor determines at least the position of the at least one object in real-time using the pressure sensor.

According to a further aspect of the present disclosure, the system further includes an optical sensor disposed in the area. The processor determines at least the position of the at least one object in real-time using the optical sensor.

According to still a further another aspect of the present disclosure, the system further includes an infrared camera disposed in the area. The operations further include detecting, using the infrared camera, a predetermined relationship between a guest in the area and the virtual reality projected on the at least one object, and modifying the virtual reality projected on the at least one object in response to the detecting of the predetermined relationship.

According to another aspect of the present disclosure, the system further includes a humidifier disposed in the area in a predetermined relationship with the at least one object, the humidifier configured to release water vapor in the area. The projector projects the virtual reality on the water vapor.

According to yet another aspect of the present disclosure, the processor identifies the area of the service to be enhanced based on an input to an entertainment system. The processor further identifies the one of the plurality of designated themes based on a content of entertainment provided by the entertainment system in response to the input to the entertainment system.

According to a further aspect of the present disclosure, the system further includes a thermostat disposed in the area. The operations control a setting of the thermostat in accordance with the one of the plurality of designated themes.

According to still a further another aspect of the present disclosure, the processor identifies the area of the service to be enhanced based on an order being placed through a meal delivery system. The processor further identifies the one of the plurality of designated themes based on the order.

According to another aspect of the present disclosure, the system further includes a proximity sensor disposed in the area. The proximity sensor is configured to detect a presence of a guest in the area. The operations control the projecting of the virtual reality on the at least one object based on a detection of the presence of the guest in the area by the proximity sensor.

According to yet another aspect of the present disclosure, the system further includes a second projector disposed in a second area different than the area in which the projector is disposed. The second area includes an attraction. The system even further includes a second proximity sensor disposed in the second area. The second proximity sensor is configured to detect the presence of the guest in the second area. The operations further control a theme of the attraction in accordance with the one of the plurality of designated themes based on a detection of the presence of the guest in the second area by the second proximity sensor.

According to a further aspect of the present disclosure, the virtual reality projected on the at least one object is configured to be viewed by a guest using a headset.

According to still a further another aspect of the present disclosure, the system further includes a fragrance emitter disposed in the area. The operations control the fragrance emitter to emit a fragrance in accordance with the one of the plurality of designated themes.

According to another aspect of the present disclosure, the system further includes a faucet disposed in the area. The operations control the faucet to change at least one of a color of light emitted by the faucet, a spray pattern of the faucet, or a water pressure of the faucet in accordance with the one of the plurality of designated themes.

According to yet another aspect of the present disclosure, the projector projects, with the projector, the virtual reality when detecting that a door of a room within which the projector is disposed is unlocked.

According to a further aspect of the present disclosure, a non-transitory computer-readable medium having an executable computer program for enhancing a service using virtual reality is provided. The executable computer program, when executed by a processor, causes the processor to perform operations. The operations include identifying an area of the service to be enhanced using the virtual reality and one of a plurality of designated themes. The plurality of designated themes is stored in a database. Theme projection information is stored for each of the plurality of designated themes. The operations further include identifying at least one object in the area. The at least one object is to be enhanced using the virtual reality. The operations even further include acquiring a position and dimensions of the at least one object in the area, and extracting, from the database, the theme projection information corresponding to the one of the plurality of the designated themes. The operations project, with the projector, the virtual reality on the at least one object using a three-dimensional modeling tool based on the dimensions of the at least one object and the theme projection information corresponding to the one of the plurality of the designated themes.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for enhancing a service using virtual reality, the system comprising:
   a projector disposed in an area;
   a database that stores theme projection information for each of a plurality of designated themes for enhancing the service using the virtual reality;
   a processor;
   a memory storing instructions that, when executed by the processor, cause the processor to perform operations including:
      identifying the area of the service to be enhanced using the virtual reality and one of the plurality of designated themes;
      identifying at least one object in the area, the at least one object to be enhanced using the virtual reality;
      acquiring a position and dimensions of the at least one object in the area;
      extracting, from the database, the theme projection information corresponding to the one of the plurality of designated themes; and
      projecting, with the projector, the virtual reality on the at least one object using a three-dimensional modeling tool based on the position and the dimensions of the at least one object and the theme projection information corresponding to the one of the plurality of designated themes; and
   a position sensor disposed on the at least one object,
   wherein the acquiring of the position and the dimensions of the at least one object includes determining at least one of the position and the dimensions of the at least one object in real-time, and
   the processor determines at least the position of the at least one object in real-time using the position sensor.

2. A system for enhancing a service using virtual reality, the system comprising:
   a projector disposed in an area;
   a pressure sensor disposed in the area;
   a database that stores theme projection information for each of a plurality of designated themes for enhancing the service using the virtual reality;
   a processor; and
   a memory storing instructions that, when executed by the processor, cause the processor to perform operations including:
      identifying the area of the service to be enhanced using the virtual reality and one of the plurality of designated themes;
      identifying at least one object in the area, the at least one object to be enhanced using the virtual reality;
      acquiring a position and dimensions of the at least one object in the area;
      extracting, from the database, the theme projection information corresponding to the one of the plurality of designated themes; and
      projecting, with the projector, the virtual reality on the at least one object using a three-dimensional modeling tool based on the position and the dimensions of the at least one object and the theme projection information corresponding to the one of the plurality of designated themes,
   wherein the acquiring of the position and the dimensions of the at least one object includes determining at least one of the position and the dimensions of the at least one object in real-time, and
   the processor determines at least the position of the at least one object in real-time using the pressure sensor.

3. A system for enhancing a service using virtual reality, the system comprising:
   a projector disposed in an area;
   an optical sensor disposed in the area;
   a database that stores theme projection information for each of a plurality of designated themes for enhancing the service using the virtual reality;
   a processor; and
   a memory storing instructions that, when executed by the processor, cause the processor to perform operations including:
      identifying the area of the service to be enhanced using the virtual reality and one of the plurality of designated themes;
      identifying at least one object in the area, the at least one object to be enhanced using the virtual reality;
      acquiring a position and dimensions of the at least one object in the area;
      extracting, from the database, the theme projection information corresponding to the one of the plurality of designated themes; and
      projecting, with the projector, the virtual reality on the at least one object using a three-dimensional modeling tool based on the position and the dimensions of the at least one object and the theme projection information corresponding to the one of the plurality of designated themes,
   wherein the acquiring of the position and the dimensions of the at least one object includes determining at least one of the position and the dimensions of the at least one object in real-time, and
   the processor determines at least the position of the at least one object in real-time using the optical sensor.

4. A system for enhancing a service using virtual reality, the system comprising:
   a projector disposed in an area;
   an infrared camera disposed in the area;
   a database that stores theme projection information for each of a plurality of designated themes for enhancing the service using the virtual reality;
   a processor; and
   a memory storing instructions that, when executed by the processor, cause the processor to perform operations including:
      identifying the area of the service to be enhanced using the virtual reality and one of the plurality of designated themes;
      identifying at least one object in the area, the at least one object to be enhanced using the virtual reality;
      acquiring a position and dimensions of the at least one object in the area;

extracting, from the database, the theme projection information corresponding to the one of the plurality of designated themes;

projecting, with the projector, the virtual reality on the at least one object using a three-dimensional modeling tool based on the position and the dimensions of the at least one object and the theme projection information corresponding to the one of the plurality of designated themes;

detecting, using the infrared camera, a predetermined relationship between a guest in the area and the virtual reality projected on the at least one object; and modifying the virtual reality projected on the at least one object in response to the detecting of the predetermined relationship.

5. A system for enhancing a service using virtual reality, the system comprising:

a projector disposed in an area;

a database that stores theme projection information for each of a plurality of designated themes for enhancing the service using the virtual reality;

a processor;

a memory storing instructions that, when executed by the processor, cause the processor to perform operations including:

identifying the area of the service to be enhanced using the virtual reality and one of the plurality of designated themes;

identifying at least one object in the area, the at least one object to be enhanced using the virtual reality;

acquiring a position and dimensions of the at least one object in the area;

extracting, from the database, the theme projection information corresponding to the one of the plurality of designated themes; and projecting, with the projector, the virtual reality on the at least one object using a three-dimensional modeling tool based on the position and the dimensions of the at least one object and the theme projection information corresponding to the one of the plurality of designated themes; and a humidifier disposed in the area in a predetermined relationship with the at least one object, the humidifier configured to release water vapor in the area, wherein the projector projects the virtual reality on the water vapor.

6. A system for enhancing a service using virtual reality, the system comprising:

a projector disposed in an area;

a thermostat disposed in the area;

a database that stores theme projection information for each of a plurality of designated themes for enhancing the service using the virtual reality;

a processor; and a memory storing instructions that, when executed by the processor, cause the processor to perform operations including:

identifying the area of the service to be enhanced using the virtual reality and one of the plurality of designated themes;

identifying at least one object in the area, the at least one object to be enhanced using the virtual reality;

acquiring a position and dimensions of the at least one object in the area;

extracting, from the database, the theme projection information corresponding to the one of the plurality of designated themes;

projecting, with the projector, the virtual reality on the at least one object using a three-dimensional modeling tool based on the position and the dimensions of the at least one object and the theme projection information corresponding to the one of the plurality of designated themes; and controlling a setting of the thermostat in accordance with the one of the plurality of designated themes.

7. A system for enhancing a service using virtual reality, the system comprising:

a projector disposed in an area;

a database that stores theme projection information for each of a plurality of designated themes for enhancing the service using the virtual reality;

a processor; and a memory storing instructions that, when executed by the processor, cause the processor to perform operations including:

identifying the area of the service to be enhanced using the virtual reality and one of the plurality of designated themes;

identifying at least one object in the area, the at least one object to be enhanced using the virtual reality;

acquiring a position and dimensions of the at least one object in the area;

extracting, from the database, the theme projection information corresponding to the one of the plurality of designated themes; and projecting, with the projector, the virtual reality on the at least one object using a three-dimensional modeling tool based on the position and the dimensions of the at least one object and the theme projection information corresponding to the one of the plurality of designated themes, wherein the processor identifies the area of the service to be enhanced based on an order being placed through a meal delivery system, and the processor identifies the one of the plurality of designated themes based on the order.

8. A system for enhancing a service using virtual reality, the system comprising:

a projector disposed in an area;

a second projector disposed in a second area different than the area in which the projector is disposed, the second area including an attraction;

a proximity sensor disposed in the area, the proximity sensor configured to detect a presence of a guest in the area;

a second proximity sensor disposed in the second area, the second proximity sensor configured to detect the presence of the guest in the second area;

a database that stores theme projection information for each of a plurality of designated themes for enhancing the service using the virtual reality;

a processor; and a memory storing instructions that, when executed by the processor, cause the processor to perform operations including:

identifying the area of the service to be enhanced using the virtual reality and one of the plurality of designated themes;

identifying at least one object in the area, the at least one object to be enhanced using the virtual reality;

acquiring a position and dimensions of the at least one object in the area;

extracting, from the database, the theme projection information corresponding to the one of the plurality of designated themes; and projecting, with the projector, the virtual reality on the at least one object using a three-dimensional modeling tool based on the position and the dimensions of the at least one object and the theme projection information corresponding to the one of the plurality of designated themes;

controlling the projecting of the virtual reality on the at least one object based on a detection of the presence of the guest in the area by the proximity sensor; and controlling a theme of the attraction in accordance with the one of the plurality of designated themes based on a detection of the presence of the guest in the second area by the second proximity sensor.

9. A system for enhancing a service using virtual reality, the system comprising:

a projector disposed in an area;

a database that stores theme projection information for each of a plurality of designated themes for enhancing the service using the virtual reality;

a processor; and a memory storing instructions that, when executed by the processor, cause the processor to perform operations including:

identifying the area of the service to be enhanced using the virtual reality and one of the plurality of designated themes;

identifying at least one object in the area, the at least one object to be enhanced using the virtual reality;

acquiring a position and dimensions of the at least one object in the area;

extracting, from the database, the theme projection information corresponding to the one of the plurality of designated themes; and projecting, with the projector, the virtual reality on the at least one object using a three-dimensional modeling tool based on the position and the dimensions of the at least one object and the theme projection information corresponding to the one of the plurality of designated themes, wherein the virtual reality projected on the at least one object is configured to be viewed by a guest using a headset.

10. A system for enhancing a service using virtual reality, the system comprising:

a projector disposed in an area;

a fragrance emitter disposed in the area;

a database that stores theme projection information for each of a plurality of designated themes for enhancing the service using the virtual reality;

a processor; and a memory storing instructions that, when executed by the processor, cause the processor to perform operations including:

identifying the area of the service to be enhanced using the virtual reality and one of the plurality of designated themes;

identifying at least one object in the area, the at least one object to be enhanced using the virtual reality;

acquiring a position and dimensions of the at least one object in the area;

extracting, from the database, the theme projection information corresponding to the one of the plurality of designated themes;

projecting, with the projector, the virtual reality on the at least one object using a three-dimensional modeling tool based on the position and the dimensions of the at least one object and the theme projection information corresponding to the one of the plurality of designated themes; and controlling the fragrance emitter to emit a fragrance in accordance with the one of the plurality of designated themes.

11. A system for enhancing a service using virtual reality, the system comprising:

a projector disposed in an area;

a faucet disposed in the area;

a database that stores theme projection information for each of a plurality of designated themes for enhancing the service using the virtual reality;

a processor; and a memory storing instructions that, when executed by the processor, cause the processor to perform operations including:

identifying the area of the service to be enhanced using the virtual reality and one of the plurality of designated themes;

identifying at least one object in the area, the at least one object to be enhanced using the virtual reality;

acquiring a position and dimensions of the at least one object in the area;

extracting, from the database, the theme projection information corresponding to the one of the plurality of designated themes;

projecting, with the projector, the virtual reality on the at least one object using a three-dimensional modeling tool based on the position and the dimensions of the at least one object and the theme projection information corresponding to the one of the plurality of designated themes; and controlling the faucet to change at least one of a color of light emitted by the faucet, a spray pattern of the faucet, or a water pressure of the faucet in accordance with the one of the plurality of designated themes.

12. A system for enhancing a service using virtual reality, the system comprising:

a projector disposed in an area;

a database that stores theme projection information for each of a plurality of designated themes for enhancing the service using the virtual reality;

a processor; and a memory storing instructions that, when executed by the processor, cause the processor to perform operations including:

identifying the area of the service to be enhanced using the virtual reality and one of the plurality of designated themes;

identifying at least one object in the area, the at least one object to be enhanced using the virtual reality;

acquiring a position and dimensions of the at least one object in the area;

extracting, from the database, the theme projection information corresponding to the one of the plurality of designated themes; and projecting, with the projector, the virtual reality on the at least one object using a three-dimensional modeling tool based on the position and the dimensions of the at least one object and the theme projection information corresponding to the one of the plurality of designated themes,
wherein the projector projects, with the projector, the virtual reality when detecting that a door of a room within which the projector is disposed is unlocked.

* * * * *